A. B. LANDIS.
RESILIENT TIRE.
APPLICATION FILED SEPT. 7, 1911.

1,142,892. Patented June 15, 1915.

Witnesses
L. A. Price
K. R. Cunningham

Inventor
Abraham B. Landis
By C. W. Bradford
Attorney

UNITED STATES PATENT OFFICE.

ABRAHAM B. LANDIS, OF ENFIELD, PENNSYLVANIA.

RESILIENT TIRE.

1,142,892.　　　　Specification of Letters Patent.　　Patented June 15, 1915.

Application filed September 7, 1911.　Serial No. 648,236.

*To all whom it may concern:*

Be it known that I, ABRAHAM B. LANDIS, a citizen of the United States, residing at Enfield, in the county of Montgomery and State of Pennsylvania, have invented certain new and useful Improvements in Resilient Tires, of which the following is a specification.

The use of pneumatic tires, as is well known, is attended with many expensive difficulties due to punctures, undue wear and blow-outs caused by the strain of the air pressure, etc., all of which reduce the natural endurance and life of the material and add greatly to the expense of the up-keep of vehicles using such tires and also cause many expensive and annoying delays, often of serious consequence to the passengers.

The object of my said invention is to provide a tire having all the resiliency and other advantages of the pneumatic tire but not dependent upon internal pressure to maintain its form, and one the utility of which is not affected by punctures, whereby the above disadvantages of a pneumatic tire are overcome and a resilient tire provided possessing all its advantages, as well as being less expensive to manufacture but more durable and substantial, all as will be hereinafter more fully set forth.

Figure 1:
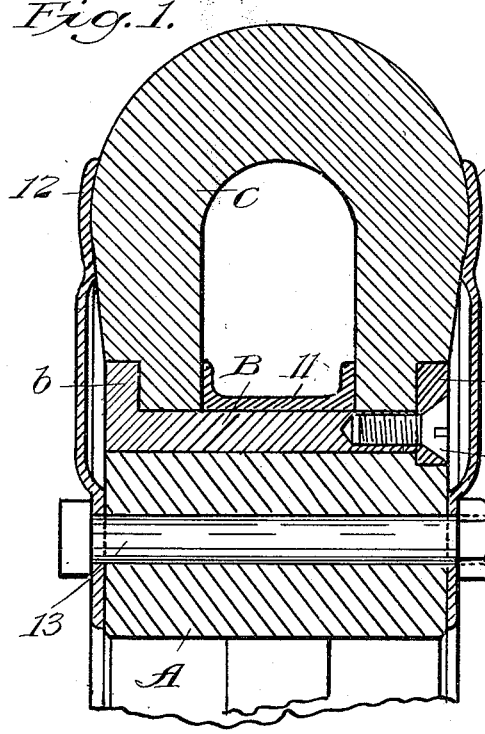
Figure 2:
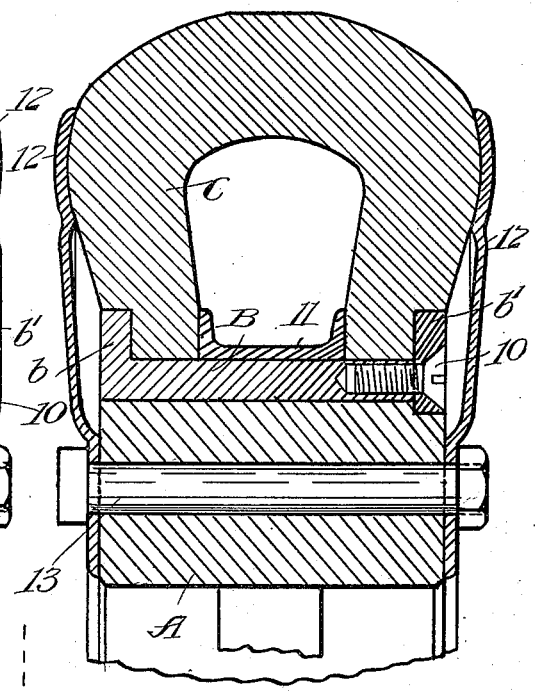
Figure 3:
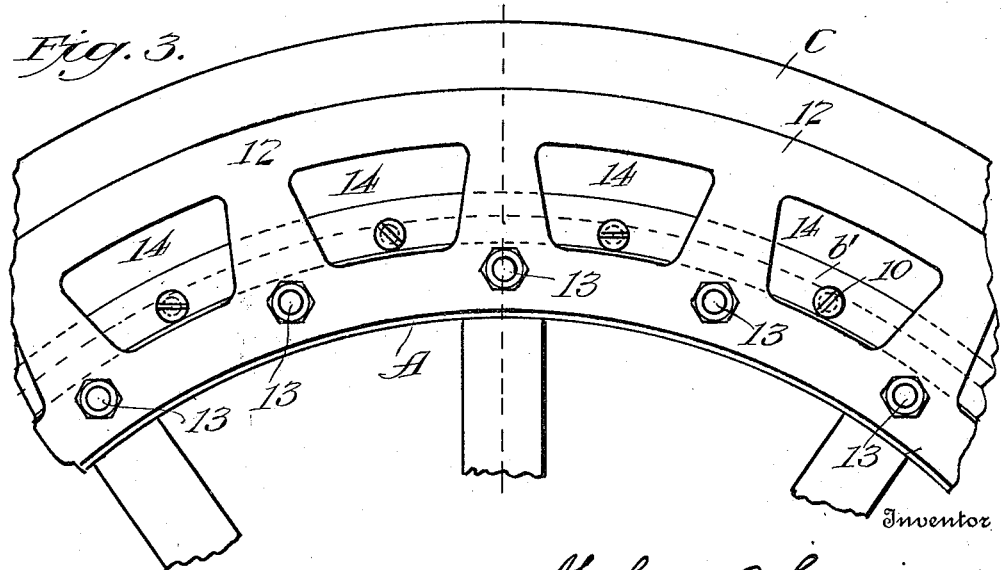

Referring to the accompanying drawings, which form a part hereof and on which similar reference characters indicate similar parts, Figure 1 is a cross section through the rim of a wheel provided with one of my said resilient tires showing the form and position of parts as when free from pressure, Fig. 2 a similar view showing the tire as when under pressure or carrying a load, and Fig. 3 a side elevation of a section of the rim of a wheel provided with said tire.

In said drawings the portions marked A represent the wheel rim, B the tire holding rim, and C the tire. The wheel rim A is, or may be, the rim of any vehicle wheel for which resilient tires are adapted. The tire holding rim B is of metal and is mounted on wheel rim A, surrounding the same. It has an integral flange $b$ on one edge and a detachable flange $b'$ secured by screws 10 to its opposite edge.

The tire C is preferably of rubber and of a crescent, or an inverted U, shape in cross section. It is made of greater thickness than the ordinary shoe of a common tire but with a central hollow space of sufficient size to lend to it the degree of resiliency desired. The outer edges or corners of the legs of the tire are recessed and engage, respectively, between the flanges $b$ and $b'$, over which said recesses fit, and corresponding annular flanges on the opposite edges of a central ring 11 mounted on the tire holding rim B. In placing the tire in position the detachable flange or rim $b'$ is removed and the inner edges of the tire put in place, as shown in Figs. 1 and 2, the flange $b'$ is then replaced and the screws 10 screwed up to clamp said inner edges securely between the flanges of ring 11 and the flanges $b$ and $b'$ of tire holding rim B.

In order to support the tire under a load I provide spring steel supports 12, shown in the form of annular rims, bolted to each side of rim A by bolts 13. Said supports extend out to bear against the opposite sides of the tire at substantially its widest point and are of a form in cross section best shown in Figs. 1 and 2, their outer portions being formed with convex inner faces to conform to the contour of the tire and afford a firm support therefor. Said supports are shown with openings 14 at intervals to render them of the degree of elasticity desired for the purpose. These may or may not be necessary according to the stiffness needed for special uses. They may, of course, be formed in sections if preferred, and be of various forms found suitable for various classes of work. By such a means the resilient shoe is held to support the load and affords substantially the same character of resiliency afforded by a pneumatic tire. The side spring supports tend at all times to hold the shoe in operative form and as soon as relieved from the load restore it to its original shape. Said steel supports also serve as an armor, or protection to the tire and receive the impact of contact with stones etc., which commonly cause more or less destruction to the sides of tires. The thickness of the shoe affords long wearing qualities and the usual inner tube being dispensed with the construction is simplified and a tire provided of long life and great utility.

Having thus fully described my said invention, what I claim as new and desire to secure by Letters Patent, is:

1. A resilient tire comprising a flexible shoe of an inverted U-shaped in cross-section, means for clamping the edges of the two sides of said shoe securely to the rim of the wheel at points adjacent to the respective edges thereof, and means for supporting said shoe consisting of a pair of steel rings secured respectively to the sides of the rim of the wheel and extending outwardly with their ends shaped to fit against the sides of said shoe at a point intermediate between its connection with the rim and the tread thereof, substantially as set forth.

2. A resilient tire for wheels comprising a flexible shoe U-shaped in cross section adapted to be secured to the rim of the wheel with its edges in line with the outer edges of said rim, and means for supporting said tire comprising a pair of steel rings secured to the sides of said rim below the secured edges of said tire and projecting outwardly and bearing against the respective sides of said tire at a point on each side intermediate its inner secured edges and its tread, substantially as set forth.

In witness whereof, I, have hereunto set my hand and seal at Washington, D. C. this fourth day of September, A. D. nineteen hundred and eleven.

ABRAHAM B. LANDIS. [L. S.]

Witnesses:
J. D. YOAKLEY,
L. A. PRICE.

Copies of this patent may be obtained for five cents each, by addressing the "Commissioner of Patents, Washington, D. C."